No. 794,235. PATENTED JULY 11, 1905.
J. W. LATIMER.
THILL ATTACHMENT FOR HARVESTING MACHINES.
APPLICATION FILED MAR. 6, 1905.
3 SHEETS—SHEET 1.
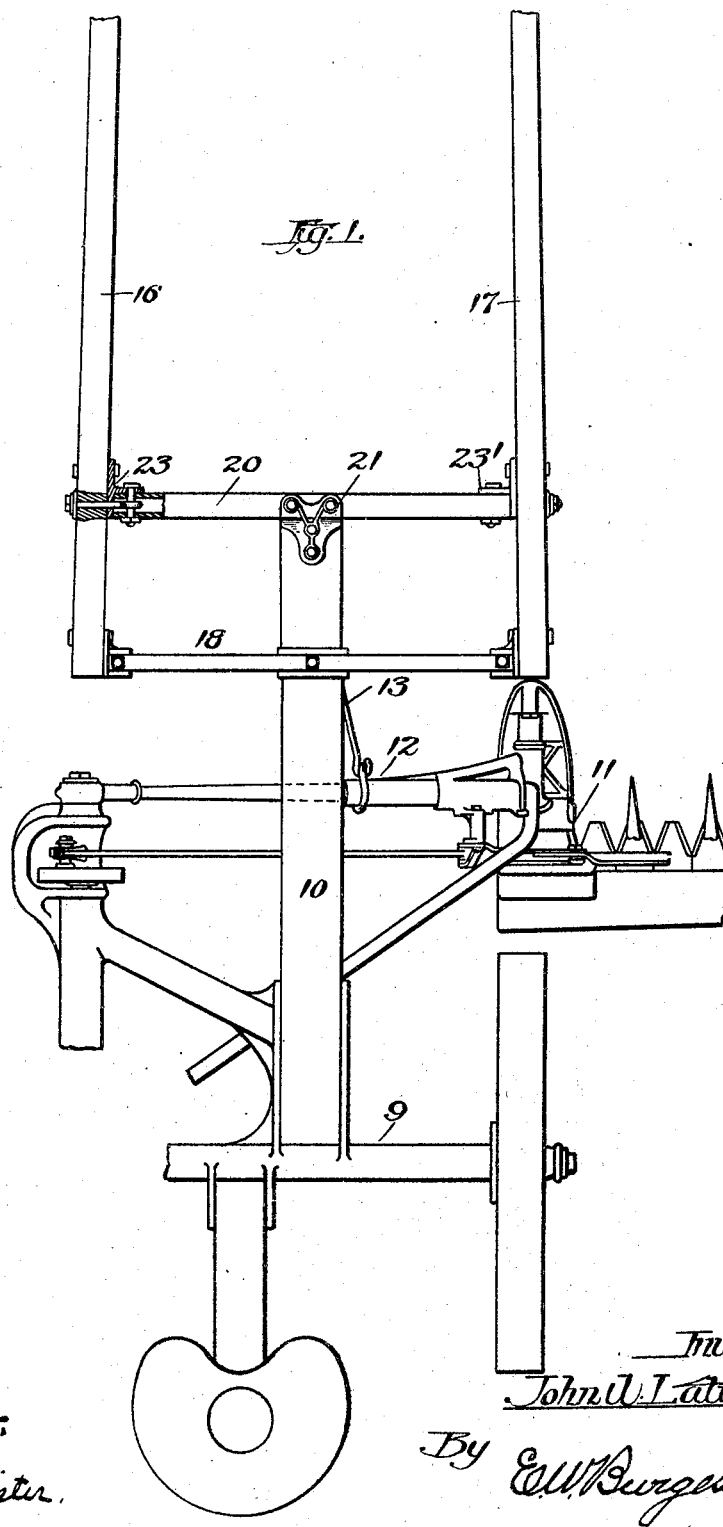

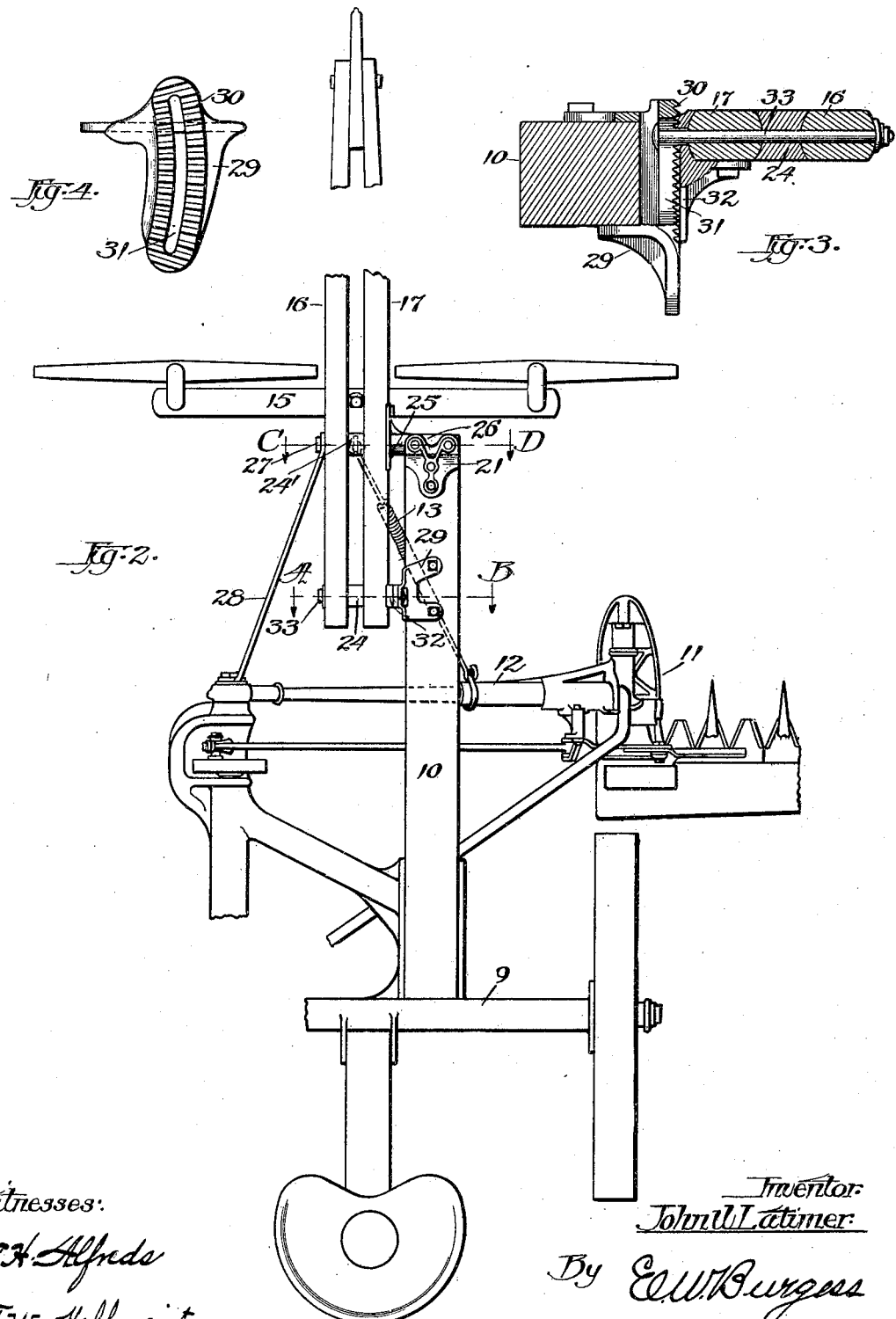

No. 794,235. PATENTED JULY 11, 1905.
J. W. LATIMER.
THILL ATTACHMENT FOR HARVESTING MACHINES.
APPLICATION FILED MAR. 6, 1905.
3 SHEETS—SHEET 3.
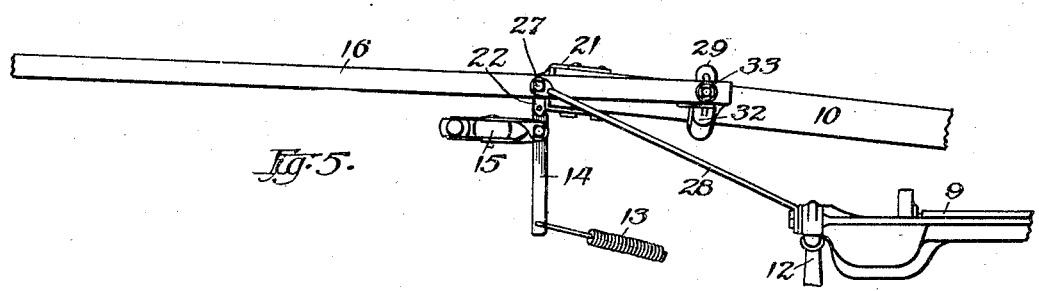
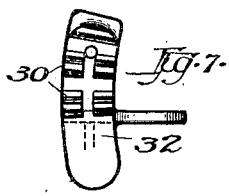
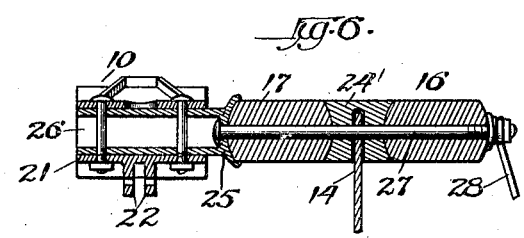
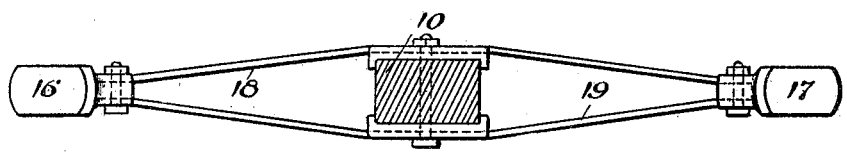
Witnesses:
T. H. Alfred
F. W. Hoffmeister.
Inventor
John W. Latimer
By E. W. Burgess
Atty.

No. 794,235.  
Patented July 11, 1905.

UNITED STATES PATENT OFFICE.

JOHN W. LATIMER, OF CHICAGO, ILLINOIS, ASSIGNOR TO INTERNATIONAL HARVESTER COMPANY, A CORPORATION OF NEW JERSEY.

THILL ATTACHMENT FOR HARVESTING-MACHINES.

SPECIFICATION forming part of Letters Patent No. 794,235, dated July 11, 1905.

Application filed March 6, 1905. Serial No. 248,498.

*To all whom it may concern:*

Be it known that I, JOHN W. LATIMER, a citizen of the United States, residing at Chicago, in the county of Cook and State of Illinois, have invented certain new and useful Improvements in Thill Attachments for Harvesting-Machines, of which the following is a specification, reference being had to the accompanying drawings, forming a part thereof.

My invention relates to thill attachments for harvesting-machines. In attachments of this character it has been found desirable to have the thills so constructed and arranged relative to the machine-frame that they may be readily transposed from a position suitable for the use of a single draft-animal to one adapted for the use of two—one upon each side of the two thill members when they are arranged as a pole attachment, as is quite common in the hay-rake class of machines. When a single draft-animal is used, the line of draft may be nearer the cutting apparatus and standing crop than when two are used; and one of the objects of my invention is to provide means by which the thills may be readily changed from a position relative to the main frame of the machine where they are adapted for the use of one draft-animal to a position adapted for the use of two. It has also been found advisable in the operation of machines provided with such attachments that means be provided whereby the angle of the attachment when in position to accommodate two draft-animals may be adjusted relative to the machine-frame, as it frequently happens that the attachment when in such position is not carried as high as when only one draft-animal is used, and to preserve the same relative position of the operative parts of the machine when such change is made is desirable; and a second object of my invention is to provide means whereby such an adjustment may be easily and readily made.

A third object of my invention is to provide means whereby the draft attachment may be moved laterally with reference to the line of advance of the machine from a position adapted for one draft-animal to one adapted for two.

The mechanism by which I attain these objects is shown by the accompanying drawings and described in the specification, in which—

Figure 1 represents a plan view of so much of a machine of the class described having the thills attached thereto and adapted for one draft-animal as is sufficient to illustrate my invention. Fig. 2 is a similar view showing the thills in position forming a pole for the use of two draft-animals. Fig. 3 is a transverse section on line A B of Fig. 2 looking in the direction of the arrows. Fig. 4 is a detail of one of the members forming the adjustable connection between the rear end of the thills when used as a pole and the machine-frame. Fig. 5 is a detached side view of parts of the attachment. Fig. 6 is a transverse section on line C D of Fig. 2. Fig. 7 is a detail of a complementary member of the adjustable connection shown in Fig. 4, and Fig. 8 is a rear end view of the thills as applied to the frame of the machine as shown in Fig. 1.

Like reference-numerals denote like parts.

9 represents the frame of the machine, having what is usually called a "stub-pole" 10 attached thereto and which for the purpose of this invention may be considered an integral part of said frame. 11 represents the cutting apparatus joined to the frame by means of the coupling-bar 12. 13 is a common form of yielding draft connection between the coupling-bar 12 and a pendent link 14, pivoted at the end of the frame-piece 10 and having the evener 15 connected therewith. 16 and 17 are the thills, secured at their rear ends to opposite ends of two bars 18 and 19, that are secured at their middle part to the upper and lower side of the frame member 10, as shown in Fig. 8. 20 is a tubular cross-bar connection secured to the forward end of the frame member 10 in advance of the bars 18 and 19 and having its opposite ends secured to the thills 16 and 17. 21 is a head-piece secured to the end of the frame member 10 and to which the cross-bar 20 is secured, and 22 represents depending ear portions adapted to receive the upper end of the pendent draft-link 14. 23 and 23' are bracket-pieces secured to opposite ends of the tubular cross-bar 20 and to which the thills 16 and 17 are secured, the above being a description of the attachment when adapted for the use of one draft-animal.

When the attachment is adapted to be used with two draft-animals, it is transposed to the position shown in Fig. 2, wherein division-blocks 24 and 24' are placed between the thills, and a bracket-piece 25, having a tubular stem portion 26, is secured to the head-piece 21, having a limited pivotal movement relative thereto, and a through-bolt 27 secures the thills thereto, and the division-block 24' is provided with a slot in its under side that communicates with the opening for the through-bolt and receives the upper end of the pendent link 14, which is pivoted on the bolt, as shown in Fig. 6, and a brace 28 extends from the outer end of the through-bolt to the frame of the machine, as shown in Fig. 2. Secured to the frame member 10, adjacent to the rear ends of the thills, is a bracket 29, having a toothed bearing-surface 30 and a slot 31 concentric with the through-bolt 27 and adapted to receive the complementary toothed member 32, secured to the thills, and having the through-bolt 33 securing the thills and the two toothed members in engagement, as shown in Fig. 3. When it is desired to adjust the rear end of the attachment up or down relative to the machine-frame, the securing means are released, and the toothed member 32 may then be adjusted along the member 29 to any desired position and there secured.

What I claim as my invention, and desire to secure by Letters Patent, is—

1. In a thill attachment for harvesting-machines, the combination of the machine-frame having a forwardly-extending frame member, the thills, means for securing said thills to said frame member in a manner to adapt them for use with one draft-animal, means for transposing said thill members and arranging them in a manner to be used with two draft-animals, and means for adjusting the angular relation between the frame member and thill members, whereby the machine-frame may be maintained in the same operative position relative to the cutting apparatus, to compensate for any change of height of the forward ends of said thill members from the ground.

2. In a thill attachment for harvesting-machines, the combination of the machine-frame having a forwardly-extending frame member, the thills, means for securing said thills to said frame member in a manner to adapt them for use with one draft-animal, means for transposing said thill members and arranging them in a manner to be used with two draft-animals, said means comprising a transverse pivotal connection between the pole member of the frame and said thills, and means for adjusting said thill members about said pivotal connection.

3. In a thill attachment for harvesting-machines, the combination of the machine-frame having a forwardly-extending frame member, the thills, means for securing said thills to said frame member in a manner to adapt them for use with one draft-animal, means for transposing and arranging said thill members in a manner to be used with two draft-animals, said means comprising a transverse pivotal connection between the pole member of the frame and said thills, a bracket secured to said pole member, and an adjustable connection between said bracket and said thill members whereby said thills may be adjusted around said transverse pivot.

4. In a thill attachment for harvesting-machines, the combination of the machine-frame having a forwardly-extending frame member, the thills, means for securing said thills to said frame member in a manner to adapt them for use with one draft-animal, means for transposing and arranging said thill members in a manner to be used with two draft-animals, said means comprising a transverse pivotal connection between said frame member and said thills, a bracket secured to said frame member and having a toothed surface concentric with said pivotal connection, and a complementary bracket engaging therewith and moving with said thill members about said pivotal connection, and means for securing said thill members and said toothed members together.

5. In a thill attachment for harvesting-machines, the combination of the machine-frame having a forwardly-extending frame member, the thills, means for securing said thills to said frame member in a manner to adapt them for use with one draft-animal, comprising a tubular cross-bar mounted in a head-piece secured to the forward end of said frame member and having the thills secured to opposite ends thereof, means for transposing and arranging said thill members in a manner to be used with two draft-animals, said means comprising a bracket provided with a transversely-arranged tubular portion secured to said head-piece and having a limited pivotal movement therewith, means for securing said thills to said bracket, a bracket secured to said frame member and having a toothed surface concentric with said transversely-arranged pivot, and a complementary bracket engaging therewith and moving with said thill members about said pivot, and means for securing said thill members and said toothed members together.

6. In a thill attachment for harvesting-machines, the combination of the machine-frame having a forwardly-extending frame member, the thills, means for securing said thills to said frame member in a manner to adapt them for use with one draft-animal, comprising a tubular cross-bar mounted in a head-piece secured to the forward end of said frame member and having the thills secured to opposite sides thereof, and means for transposing and arranging said thill members in a manner to be used with two draft-animals, said means comprising a bracket provided with a transversely-arranged tubular portion secured to said head-piece and having a limited pivotal movement therewith, a brace extending from a point on the machine-frame to the axial line of said pivotal connection, a through-bolt securing the brace and thills to said bracket, and means for adjusting the thills about said pivotal connection.

7. In a thill attachment for harvesting-machines, the combination of the machine-frame having a forwardly-extending frame member, the thills, means for securing said thills to said frame member in a manner adapting them for use with one draft-animal, comprising a cross-bar mounted in a head-piece secured to the forward end of said frame member and having said thills secured to opposite ends thereof, a draft-link pivotally connected with said head-piece, means for transposing and arranging said thill members in a manner adapting them for use with two draft-animals, said means comprising a bracket pivotally connected with the head-piece, a division-block adapted to be received between the thills, said block having a transverse opening therethrough and a longitudinal slot opening downward communicating with the transverse opening and adapted to receive the upper end of said draft-link, and a bolt passing through said thills, division-block, draft-link and bracket and securing them to said head-piece.

In witness whereof I hereto affix my signature in presence of two witnesses.

JOHN W. LATIMER.

Witnesses:
WELLS WININGSTAD,
C. F. CRUMB.